Nov. 25, 1930.  W. H. PUCKETT  1,782,696

STUFFING BOX

Filed Jan. 26, 1927

Inventor
W. H. Puckett.

By Lacey & Lacey, Attorneys

Patented Nov. 25, 1930

1,782,696

UNITED STATES PATENT OFFICE

WILLIAM H. PUCKETT, OF TULSA, OKLAHOMA, ASSIGNOR TO PEERLESS SUPPLY COMPANY, OF TULSA, OKLAHOMA, A CORPORATION OF OKLAHOMA

STUFFING BOX

Application filed January 26, 1927. Serial No. 163,827.

This invention relates to stuffing boxes and has special reference to stuffing boxes for the polish rods of deep well apparatus, although the invention is applicable to all machinery in which there is a relatively movable element working in a lubricating medium. The object of the invention is to provide a packing which will accommodate the relative lateral movement of the reciprocating element and thereby avoid elongation or elliptical deformation of the packing rubbers rendering them, to some extent, inoperative to prevent the leakage of the liquid. Another object of the invention is to provide a structure which will permit lubrication of the moving element and at the same time avoid waste of the lubricant. These stated objects, and other objects which will hereinafter incidentally appear, are attained in devices such as are illustrated in the accompanying drawings, and the invention resides in certain novel features which will be particularly pointed out in the appended claim.

Figure 1:
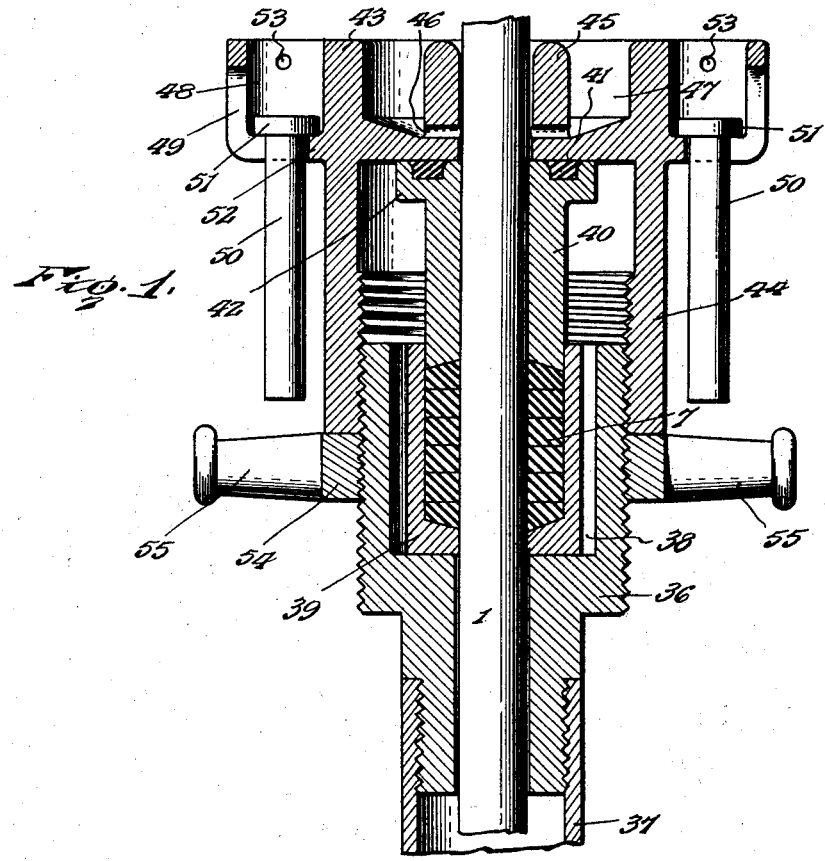
Figure 2:
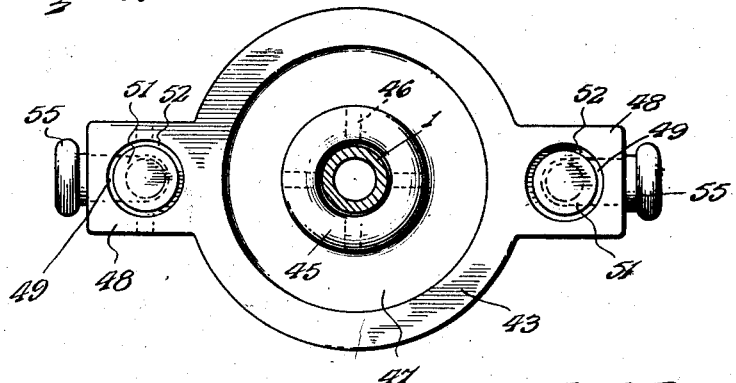

In the drawing—Figure 1 is a vertical section of the invention, and Figure 2 is a plan view thereof.

Like numerals refer to like parts in the several figures of the drawing.

The polish rod 1 carries the box 36 reduced in diameter at its lower end to fit the casing 37. The box is formed with a chamber 38 receiving the packing retainer 39 and the packing rubbers 7 placed within the retainer. The gland 40 is expanded at its upper end 42 and has seated therein a packing ring 41 so that a wide support for the head 43 is provided. This head is constructed with a depending sleeve or adjusting member 44 engaging the box 36 at its outer threaded face so that an adjustment of the head effects the required compression of the packing rubbers.

The head is formed with a central hub member 45 fitting about the polish rod and constructed with radial passages 46 in its lower portion whereby lubricant placed within the cup 47 is fed to the polish rod. The head is also provided with cup-like radial extensions 48 having openings through their bottoms and outer walls to accommodate the lever handles or rods 50. These rods have circular heads 51 at one end whereby they may rest upon and be supported by the bottom portions 52 of the cup-like extensions 48 to depend from the head, as shown in Fig. 1. The openings 53 are provided through the side walls of the extensions to receive a cotter pin or other locking element whereby the loss of the handle members will be prevented. In this form of the invention a lock nut 54 is threaded upon the box 36 and adapted to be adjusted against the lower end of the sleeve 44 after the latter has been set to prevent premature release or loosening of the sleeve with consequent reduction of pressure upon the packing rubbers. This lock nut is an internally threaded annular body having handle lugs 55 projecting therefrom.

The packing rubbers are firmly supported by and between the box at the upper end of the casing and the head which loosely encircles the polish rod but are not secured to these parts nor directly carried by them, so that they will follow the slight lateral movement of the polish rod or reciprocating element, and wear upon the rubbers will be minimized and their deformation overcome. The invention presents a very simple and efficient construction of stuffing box in which the packing rubbers may be conveniently renewed by removal of the head and gland, while in the assembled parts an improved operation is secured by mounting the retainer and gland for joint lateral movement. Further the head structure provides for the feeding of a lubricant into the gland mounted upon the polish rod.

Having thus described the invention, I claim:

In a stuffing box for polish rods, a box having a chamber in its upper portion and a depending screw threaded portion for mounting the box upon a support, a sleeve adjustably threaded upon the exterior of the box and formed with a transverse head having an enlarged axial bore with a surrounding hub and radial oil passages therethrough, a single packing retainer mounted in the chamber and being of less diameter than the chamber so as to permit free lateral sliding of the head of the retainer upon the base of the chamber, a plurality of packing rings within the retainer, and an elongated gland of less transverse diameter than the box and mounted in contact with the rod throughout its length for lateral movement therewith, said gland extending from the packing rings within the retainer to the head and being provided at said head with a packing slidably engaging the inner face of the head, whereby the retainer and its gland are slidable as a packing unit laterally of the head and box chamber.

In testimony whereof I affix my signature.

WILLIAM H. PUCKETT. [L. S.]